Patented Aug. 23, 1949

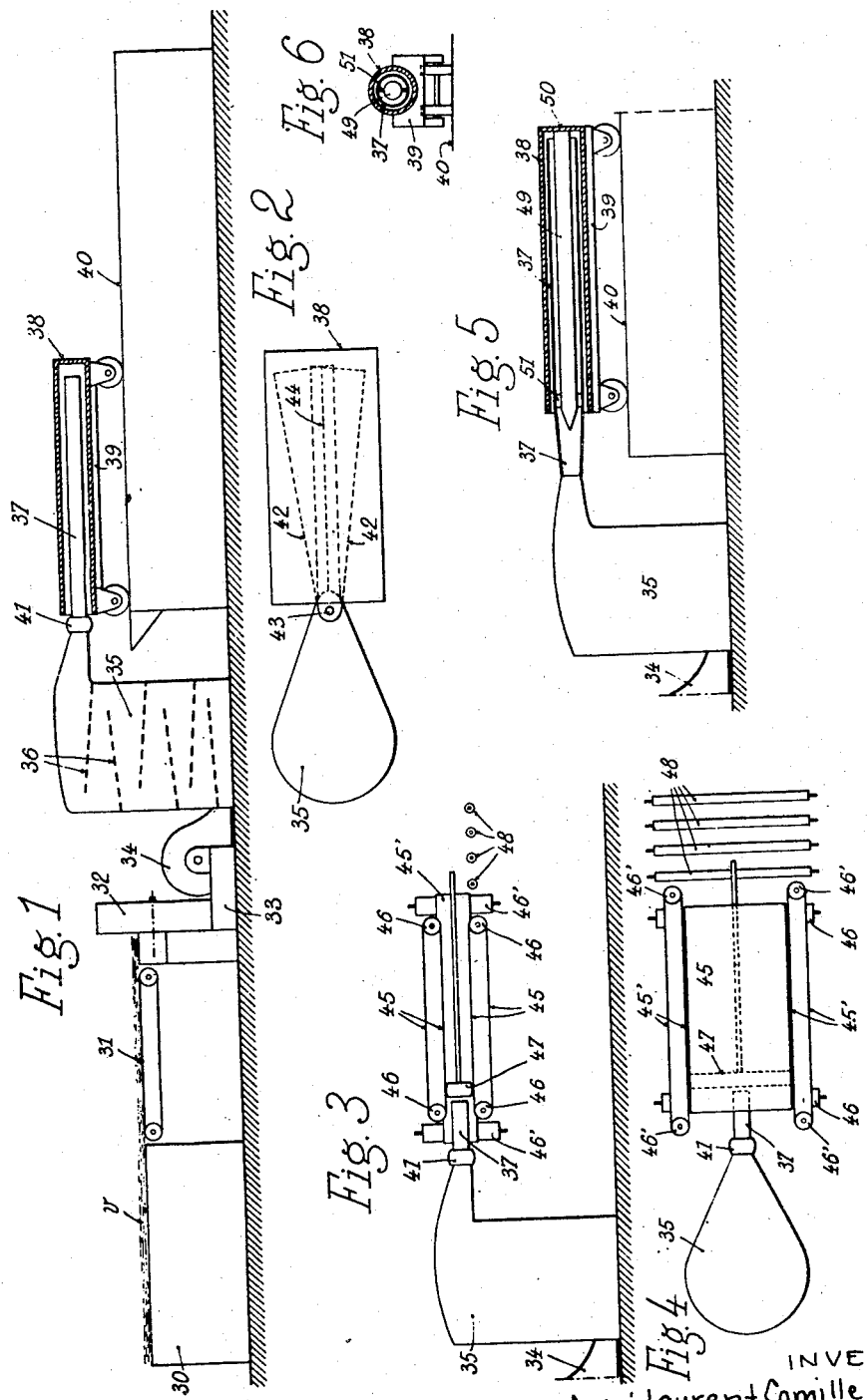

2,479,911

UNITED STATES PATENT OFFICE 2,479,911

METHOD OF AND APPARATUS FOR MANUFACTURING HEAT AND SOUND INSULATING MATERIAL

André Laurent Camille Delloye, Paris, France, assignor to Compagnies Reunies des Glaces et Verres Speciaux du Nord de la France, Nord, France, a French company Application March 22, 1945, Serial No. 584,156
In France April 10, 1941

Section 1, Public Law 690, August 8, 1946
Patent expires April 10, 1961

4 Claims. (Cl. 154—27)

One of the objects of the Patent No. 2,371,880, of March 20, 1945 (application No. 365,862, of November 16, 1940), is a method which consists in cutting glass threads, or other vitreous material, into sections of reduced and substantially uniform length, then in scattering said thread sections in a gaseous and/or liquid current, and in allowing the threads thus dispersed to settle in a mould, forming a cushion which is dried and compressed.

The present invention has for its object a modification of said method which allows of carrying out the latter more rapidly and more economically, and of adjusting easily and at will the degree of compactness of the agglomerated threads.

According to said modification, the thread sections are drawn along in a current of gas (preferably in that which has served to scatter them) so as to project them into the mould and to cause the current of gas to exert a definite pressure on the bottom of the mould and on the successive layers of threads which accumulate therein.

For that purpose, the mould and the orifice admitting the current of gas therein are, for instance, displaced relatively to each other, and the speed of this displacement is adjusted according to the desired pressure and degree of compactness of the threads.

The accompanying drawing shows, by way of examples, and diagrammatically, three devices for carrying the method into practice.

Fig. 1 illustrates in elevation and partial section a device for manufacturing an insulating cushion of flat shape and of given dimension, and Fig. 2 illustrates in plan view a modification of a portion of said device.

Fig. 3 illustrates in elevation and partial section, and Fig. 4 illustrates in plan view, a portion of the device of Fig. 1, modified for manufacturing an insulating cushion of flat shape and unlimited length.

Fig. 5 illustrates in elevation and partial section and Fig. 6 illustrates in end view a portion of the device of Fig. 1 modified for manufacturing an insulating cushion in the form of a hollow cylinder or shell.

The device of Fig. 1 comprises a table 30 on which are spread out the hanks of threads $v$ of glass or other vitreous material, arranged approximately parallel to one another, an endless conveyor 31 conveying said hanks to a cutting device 32, the speed of which is adjusted relatively to that of the displacement of the hanks, so as to cut the threads into sections of the same length, a box 33 into which fall said sections and a fan 34 which sucks them from the box 33 to project them into a chamber 35, in which the air delivered by the fan causes them to whirl so that they become scattered.

Baffle-plates 36 of any shape, adjustable in position, are preferably arranged in the chamber 35 so as to facilitate the dispersion of the threads.

At the outlet of said chamber, the threads are drawn along by the air current in a tube 37 which penetrates within a mould 38 having walls which can be dismounted and supported by a carriage 39 allowing the displacement of the mould on a plane 40.

According to the transverse dimensions of the mould, the cross-section of the tube is constant or flared. In the first case, the orientation of the current of gas projecting the threads into the mould can be adjusted by imparting arbitrarily or periodically changes of direction to the tube about a resilient pivotal joint 41. In the second case (Fig. 2) the flaring of the tube can be adjusted by means of lateral walls 42 pivoted on a spindle 43, and the action of which is completed, if need be, by deflectors 44 pivoted on the spindle 43.

The displacement of the carriage 39 and of the mould 38 is adjusted according to the working speed of the cutting device 32. When the mould is filled with glass threads which have accumulated therein while forming a cushion of more or less compact texture, the operation of the device is interrupted to allow of disengaging the cushion by dismounting the walls of the mould; then the latter is remounted and brought back on its carriage to the starting point, so as to allow another cushion to be manufactured in the same conditions as the preceding one.

In the device illustrated in Figs. 3 and 4, the walls of the mould are constituted by endless canvas sheets 45 and 45' movable about rollers 46 and 46' and by a piston 47, the speeds of displacement of said members being equal and adjusted according to the working speed of the cutting device 32.

The canvas sheets are stretched by the usual means, so that the lateral walls of the mould are as plane and as rigid as possible.

As soon as the head of the cushion, which has taken a bearing on the piston 47, issues from the space comprised between said lateral walls, the piston is removed and the cushion continues to move on rollers 48, forming a strip which is cut according to requirements.

In the device illustrated in Figs. 5 and 6, the mould encloses a core 49 carried by the bottom 50 of the mould 38 and provided with projections 51 which take a bearing on the inner wall of the tube 37 and which are tapered in the longitudinal direction so as not to hinder the current of gas and the glass threads it brings into the mould.

When the mould is filled, the operation of the device is stopped to disengage the tube or shell of glass threads which has formed therein, then the plant is started again as that of Fig. 1. The core can be capable of being taken to pieces or distortable, and may be constituted for instance by an inflated casing.

The present invention is obviously not limited to the embodiments described.

In particular, instead of displacing the mould, the outlet tube for the glass threads can be displaced, or use can be made of a telescopic tube, the elements of which can be progressively retracted in proportion as the cushion is formed in the stationary mould.

The device described eventually allows of modifying in course of operation, the speed of displacement of the mould in order to vary, if need be, the density of the insulating product.

Having now described my invention, what I claim as new and desire to secure by Letters Patent is:

1. A method of manufacturing a heat and sound insulating material which comprises cutting fibers of vitreous material into sections having a reduced and substantially uniform length, drawing along the short threads thus obtained in a stream of gaseous fluid, producing eddies in said stream for scattering said short threads and directing in an adjustable manner said thread carrying stream against the inner face of the end wall of a movable mold, the fluid stream escaping from said mold in a reverse direction relatively to the thread carrying stream.

2. An apparatus for manufacturing a heat and sound insulating material comprising in combination a device for cutting fibers of a vitreous material into sections having a short and substantially uniform length, a fan for producing an air stream in which said short threads are carried along, a chamber adapted to be traversed by the thread carrying stream and provided with baffle plates for producing eddies in said stream, a nozzle connected to the outlet of said chamber and adapted to control the thread carrying stream, a mold provided with an opening through which extends said nozzle, said mold and nozzle being so disposed as the threads are projected by said nozzle against the end wall of said mold and the air stream escapes through said opening around said nozzle and means for moving said end wall in order to progressively increase the distance between said nozzle and said end wall.

3. An apparatus as claimed in claim 2 further comprising means for pivoting said nozzle.

4. An apparatus as claimed in claim 2 further comprising means for varying the section of said nozzle.

ANDRÉ LAURENT CAMILLE DELLOYE.

REFERENCES CITED

The following references are of record in the file of this patent:

UNITED STATES PATENTS

| Number | Name | Date |
|---|---|---|
| 1,873,559 | Koontz | Dec. 10, 1907 |
| 1,756,468 | Moller | Apr. 29, 1930 |
| 1,804,254 | Friedrich | May 5, 1931 |
| 1,956,377 | Drill | Apr. 24, 1934 |
| 2,068,203 | Simpson | Jan. 19, 1937 |
| 2,257,112 | Forster | Sept. 30, 1941 |
| 2,288,072 | Collins | June 30, 1942 |
| 2,371,880 | Delloye | Mar. 20, 1945 |

FOREIGN PATENTS

| Number | Country | Date |
|---|---|---|
| 507,476 | Great Britain | June 15, 1939 |